March 25, 1969     A. J. CARBONE     3,434,849

INSULATED FROZEN DESSERT PACKAGES

Filed Nov. 4, 1966     Sheet _1_ of 3

INVENTOR.
Anthony J. Carbone
BY
Griswold & Burdick
ATTORNEYS

United States Patent Office 3,434,849
Patented Mar. 25, 1969

3,434,849
INSULATED FROZEN DESSERT PACKAGES
Anthony J. Carbone, Midland, Mich., assignor to The Dow Chemical Company, Midland, Mich., a corporation of Delaware
Filed Nov. 4, 1966, Ser. No. 592,129
Int. Cl. A23g 5/00; B65d 3/00, 17/00
U.S. Cl. 99—192
9 Claims

ABSTRACT OF THE DISCLOSURE

An insulated frozen dessert package wherein plastic foam material is provided in laminated combinations with such other materials as plastic film, papersheet and metal foil to form a container especially effective in protecting dessert products like ice milk, ice cream, ice sherbet, etc. Optimum protection is obtained by balancing the insulating qualities of the container such that the degree of insulation provided is effective in preventing the occurrence of a detrimental melt-freeze cycle, but yet it is not so great as to interfere substantially with the length of time required to harden or freeze the dessert following fill operations.

---

This invention generally relates to an insulated frozen dessert package, and more particularly, to a package of ice cream, ice milk, ice sherbet, and the like.

It has been customary in the past to package ice cream in paperboard containers which often are wax or resin coated. One such typical ice cream package is that illustrated in U.S. Patent No. 3,111,255. Although treated paperboard containers have proven both economical and easily adaptable to machine filling techniques, it is generally felt that they have not proven satisfactory from a product protection standpoint. Their chief deficiency is the relatively poor insulating characteristics of both treated and untreated paperboard. A serious impairment of quality is encountered in situations where ice cream has been subjected to a melt-freeze cycle as a result of adverse temperature fluctuations during transport, distribution, sale and the period of eventual consumption. Ice cream as packaged in the prior art is poorly protected from such temperature fluctuations and all its detrimental effects. Ice cream experiencing melt-freeze cycle fluctuations will be seriously impaired as to product uniformity, sweetness, and texture, and may often contain undesirable ice crystals. Another disadvantage inherent even in heavily treated paperboard containers is absorption of paper taste by the ice cream which becomes more noticeable as the package ages. Also, since good ice cream textures requires the proper balancing of water content in the product, moisture vapor transition through or into the relatively permeable walls of both treated and untreated paperboard containers, causes the ice cream texture, in due time, to assume an undesirably coarse texture.

It has been found that an ice cream package of insulating plastic foam material laminated with plastic film, papersheet, and/or metal foil, in accordance with this invention, would not be subject to the many disadvantages of a paper board container as above described.

Accordingly, it is an object of the present invention to provide a new and improved thermally insulated frozen dessert package.

Another object of the present invention is to provide a new and improved frozen dessert package wherein the walls thereof are comprised of laminated plies of materials secured together by an adhesive which imputes additional stiffness to the package and which adhesive can also be pigmented to provide heat reflection and decorative qualities to the package in the event a transparent outer ply is used.

Another object of at least one embodiment of the present invention is to provide a new and improved frozen dessert package which substantailly prevents moisture loss from the dessert product through the package walls.

Briefly, this invention relates to a novel frozen dessert package wherein the container thereof includes laminated walls at least one ply of which comprises a sheet of insulating plastic foam. The foam can be laminated with either papersheet, plastic film, metal foil, or a combination of these materials to provide a package having the many various advantages heretofore and hereinafter enumerated. The plies forming the laminated walls are of a thickness such that a container having highly desirable insulating structural and low vapor and moisture permeability characteristics is provided for frozen desserts and, when in combination therewith, is a substantially superior package.

Yet additional objects and advantages of the present invention, and its numerous and cognate benefits, are even more apparent and manifest in and by the ensuing description and specification taken in conjunction with the accompany drawing, in which wheresoever possible, like characters of reference designate corresponding material and parts throughout the several views thereof in which.

Figure 1:
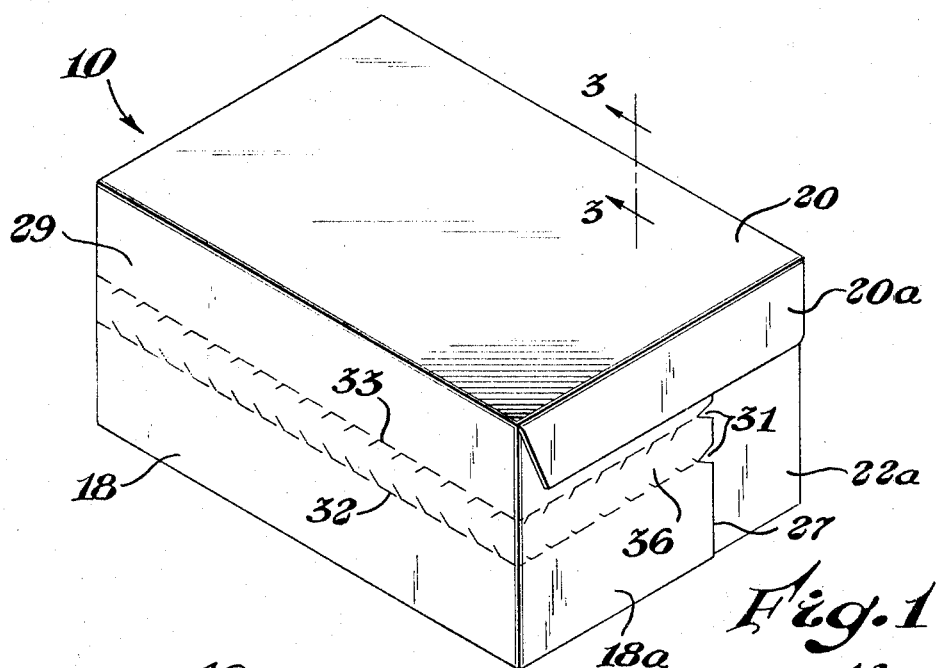
FIGURE 1 is an isometric view of a preferred embodiment of a frozen dessert package constructed according to the principles of this invention.
Figure 3:
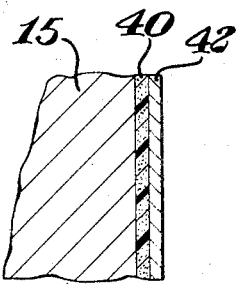
FIGURE 3 is an enlarged fragmentary cross sectional view of the package of FIGURE 1 taken along reference line 3—3 thereof.
Figure 2:
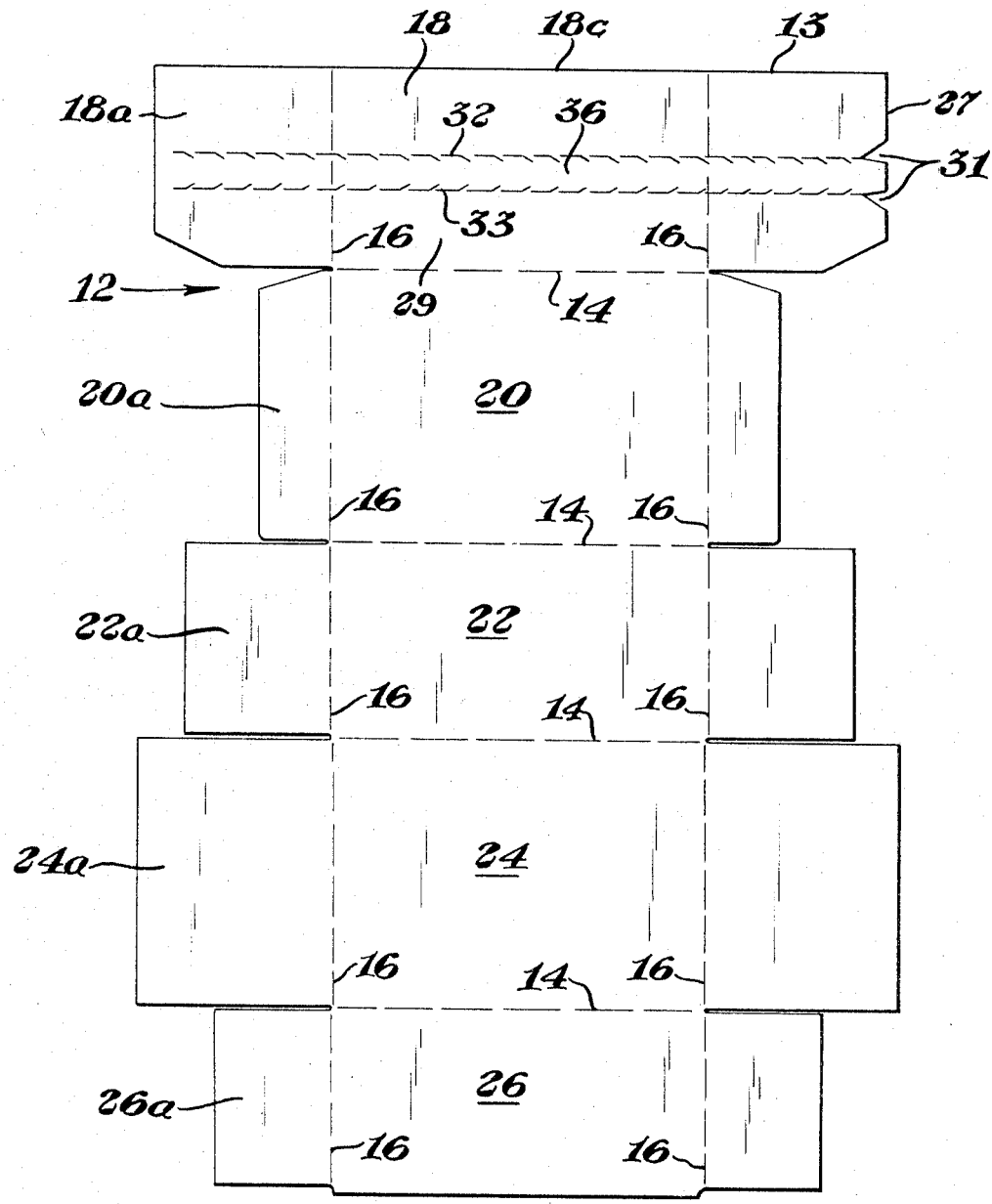
FIGURE 2 is a plan view of a blank cut, scored and perforated, and from which the trunk-lid style container forming part of the package of FIGURE 1 is formed.

Referring now more particularly to FIGURES 1–3, package 10 comprises a foldable trunk lid style carton 12 with a frozen dessert 15, such as ice cream, ice milk, or ice sherbet, etc., located therein.

Carton 12 is preferably formed from a single foldable blank 13, the material thereof being a plastic foam and papersheet laminate. Blank 13 comprises a sealing panel 18, top panel 20, back panel 22, bottom panel 24, and front panel 26, which panels when assembled in the manner hereinafter described, comprise the hollow four walled rectangular shaped body portion of carton 12. The panels are foldably joined together along score lines 14. The end portions of carton 12 are formed by end flaps 18a, 20a, 22a, 24a, and 26a which are joined to their respectively numbered panels along score line 16.

A tear strip 36, defined by perforated lines 32 and 33, extends the entire length of sealing panel 18 and end flaps 18a. Triangular shaped indentations 31 are provided at edge 27 of flap 18a as a means for grasping tear strip 36. The function of the tear strip will be more fully disclosed hereinafter.

Carton 12 is preferably assembled by first applying adhesive to the undersurface of panel 18 and flaps 18a, except along portion 29 thereof between perforated line 32 and score line 14. Blank 13 is then folded along score lines 14 in such a manner as to superimpose the undersurface of panel 18 upon front panel 26, outer edge 18c of panel 18 being lined up with score line 14 of panel 26. Heat is then applied to melt the adhesive and seal the carton. It should be noted that flaps 18a and 26a are also adhered to one another at this same time.

In closing each end of carton 12, the end flaps 18a to 26a are folded inwardly along score lines 16, to a position superimposed on one another. Bottom flap 24a is first folded inwardly to a position perpendicular to its respective panel. Back flap 22a is then placed over bottom flap 24a. Next, sealing flap 18a and front flap 26a, which are adhered inwardly, are folded inwardly, with the area common to flap 18a and flap 22a between perforated line 32 and edge 18c, being sealed. Finally, top flap 20a is directly superimposed upon flaps 18a and 22a, and the underside of flap 20a sealed to flap 18a.

The package is easily opened by removing tear strip 36 and lifting top panel 20 which forms a trunk style lid with flaps 20a, and the portions of panel 18 and flaps 18a above perforated line 33.

It is to be understood, of course, that the above described carton 12 is but a preferred carton design and that the invention is applicable to cartons of almost innumerable design. A common paperboard carton is that described in some detail in U.S. Patent No. 3,111,255, the construction of which, for example, could be readily adapted to the present invention when modified to follow the principles thereof.

The laminated construction of the walls of carton 12 and package 10 is illustrated in FIGURE 3 and comprises an inner ply of insulated plastic foam 40, preferably an expanded substantially closed cell polystyrene, which foam is adhered to an outer ply of papersheet 42. Polystyrene foam, being substantially closed cell, provides superior insulating, and "taste" inert properties not present in papersheet alone. The papersheet ply provides improved hinging, printing, stiffness and dead fold properties to the carton construction. Because of the body strength supplied by the plastic foam, the thickness of the papersheet component can be reduced from that which is required in a paperboard carton. The papersheet component can be treated, on its nonlaminated side, with a wax or resin coating, if desired. The inner ply of foam provides exceptional protection for the papersheet at its interface, by providing a barrier from the high moisture content ice cream.

Of importance is the proper selection of the thickness and density of the plastic foam ply. Laboratory evaluation has revealed that a carton having too high an insulation value will delay initial hardening time to a point where the ice cream is detrimentally affected, primarily as to texture. Hardening time refers to the time required to reduce the temperature of the ice cream to approximately 0° to −10° F. from its initial filling temperature of approximately 20° to 30° F. It has been found that a foam density in the range of about 2.0 to 8 lbs./cu. ft. and having a thickness between about 20 to 80 mils will provide the necessary insulation protection without noticeably detracting from initial product quality. In conjunction with such foam plies, the papersheet component has been found to be most functional in thicknesses of between 5 and 15 mils. When the papersheet component is much thinner than 5 mils there are noticeable deficiencies in carton stiffness. An especially advantageous combination has been found to be a polystyrene foam sheet of a thickness of about 60 mils and a density of about 3.5 lbs./cu. ft. laminated to 9 mil wax coated papersheet.

The protection characteristics of the above-described package 10 (constructed of 9 mil wax treated papersheet adhered to 3.5 lbs./cu. ft. polystyrene foam of 60 mils thickness) was compared with a prior art similar size package having a carton constructed solely from 23 mil paperboard. The results of this comparison can best be summarized by reference to the time-temperature curves of FIGURES 7 and 8, which graphical representations illustrate how each package affects both the hardening time and melt cycle of ice cream contained in its respective carton.

Figure 7:
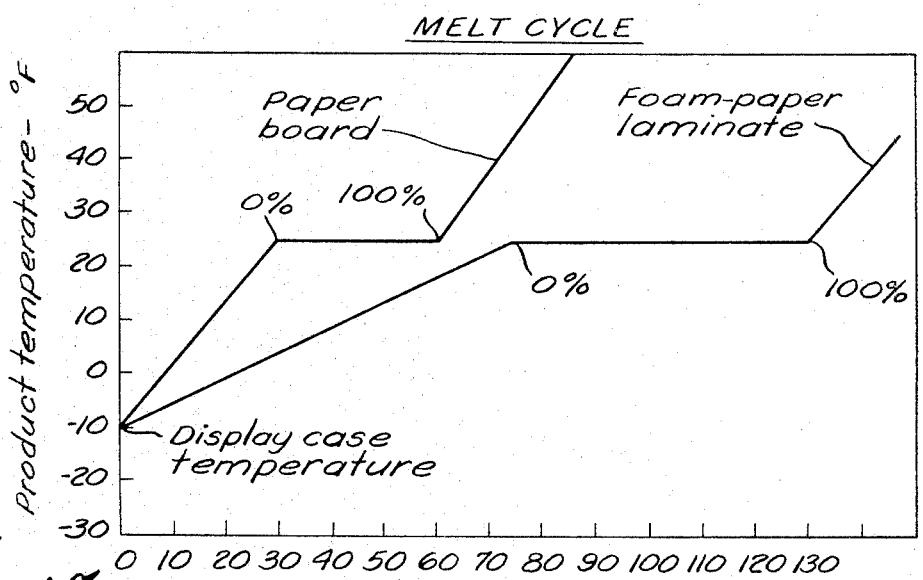
FIGURE 7 is a graphic illustration of the melt cycle of a foam and papersheet laminated package of the present invention as compared to a prior art paperboard package.

The melt cycle curves shown in FIGURE 7 are drawn for the outer one inch layer of ice cream. Ice cream is generally kept in a display case at a temperature of approximately −10° F. The critical temperature which is generally acknowledged for ice cream quality is approximately 0° F. Thus, it has been found that ice cream can be subjected to temperature fluctuations without noticeable degradation provided the product temperature does not exceed 0° F. Ice cream packaged in the prior art paperboard carton when removed from a display case at −10° F. and placed in an environment of 70° F. was found to reach this critical temperature in only 8 to 9 minutes. However, it was found that ice cream packaged in the insulated carton did not reach the critical temperature until 21 to 22 minutes had elapsed. Even under the most ideal shopping conditions, 8 or 9 minutes usually would not be expected to provide sufficient time to select the ice cream, wait at the checkout stand, pay for the product, and then drive home and place it in the freezer. By the time 30 minutes had passed, a period of time not unexpected for many shopping trips, ice cream packaged in the paper carton had reached its melt temperature of approximately 25° F. At that same point in time, ice cream packaged in the insulated carton of the present invention will be approximately at a comparatively low and tolerable 4° F. In approximately 60 minutes, ice cream packaged in the paper carton will have reached a state of 100 percent melt while ice cream in the insulted carton has yet to even reach its melt temperature.

In all phases of the above melt cycle test, ice cream packaged in the insulated carton was found to possess superior uniformity, texture, and sweetness qualities as compared to that packaged in the paperboard carton. Ice cream packaged in the insulated carton was also found to contain a lower predominance of ice crystals, was free of any "foreign taste," and had better stripping and spooning characteristics.

Figure 8:
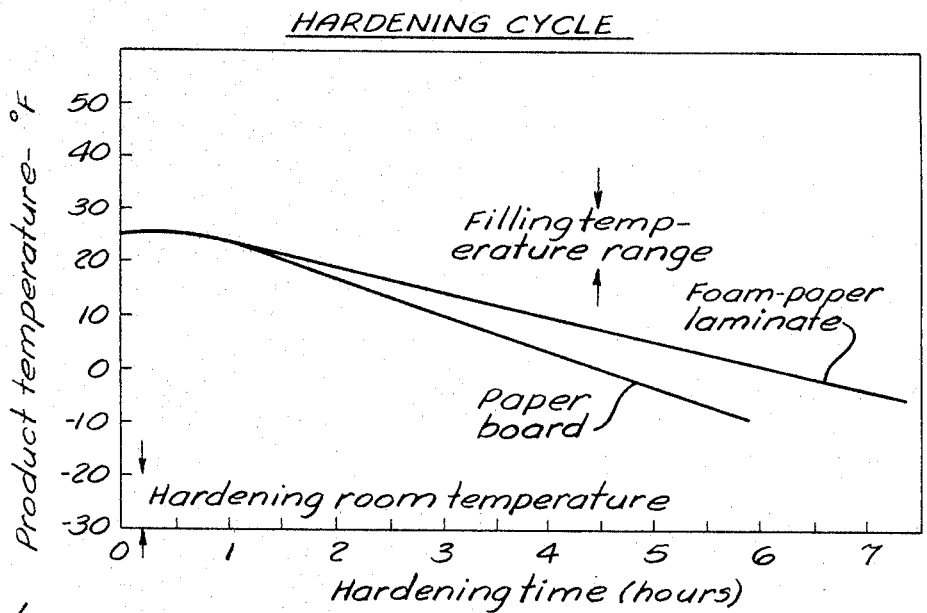
FIGURE 8 is a graphic illustration of the hardening times of a foam and papersheet laminated package of the present invention compared to a prior art paperboard package.

The graph illustrated in FIGURE 8 refers to hardening time and is drawn for a one inch cube of ice cream located in the center of the package. Obviously, this location would be the last to feel the effects of cooling. Again, as above, 0° F. is the critical temperature and cooling below this point is not necessary. Ice cream filled at 25° F. in the treated paperboard prior art carton reached this critical temperature in approximately 4½ hours. Ice cream packaged in the insulated carton required an additional 1¼ hours to cool to 0° F. Although this delayed hardening time resulted in a slightly coarser ice cream texture, it was not found to be objectionable. Ice cream in closer proximity to the walls of the insulated container was found to be completely nonobjectionable and of as fine a quality as similarly situated ice cream in the paper carton. This slightly slower hardening time which was to be expected, was far offset by the especially advantageous melt cycle effects resulting from the package of the present invention.

Another advantageous embodiment of the present invention is where the walls of the carton are constructed of a laminate wherein an outer ply 42 is plastic film, e.g., polystyrene, and the inner ply 40 is plastic foam, i.e., polystyrene foam. Since these materials are compatible, the laminate can be formed by heat laminating without the need for adhesives. However, if adhesives are used, they may be pigmented to add background color and heat reflection advantages to the package. In addition, water based adhesives, e.g., styrene-butadiene latex, which also can be pigmented, were found to impute extra stiffness characteristics to the package. A further benefit gained in using a plastic film outer covering is that printing may be done on both surfaces of the film component to add a highly novel and promotional three-dimensional decorative aspect to the package. Printing on the interface of the film component also provides for more stable decorating which is actually immune to smudging and other printing problems. The insulating properties of the above carton was found to be nearly the same as its foam and papersheet counterpart.

Figure 4:
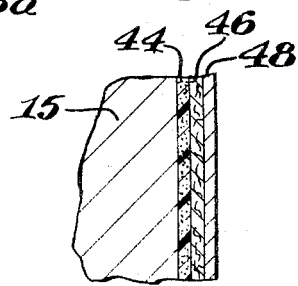
FIGURE 4 is a view like FIGURE 3 only showing a modified form of the invention.

Another advantageous embodiment of the invention can be a package comprising a carton formed of a laminate of an inner ply 44 of plastic foam, an intermediate ply 46 of papersheet, and an outer ply 48 of plastic foam, as illustrated in FIGURE 4. Such a laminated construction combines the promotional, esthetic and nonslip properties of a foam outer covering with the inert and spooning advantages of a foam inner ply. Also, it has been found, the above encapsulating combination greatly alleviates any potential warpage problems. The outer ply 48 can also be either a plastic film (as described earlier) or a metal foil, such as aluminum foil. Plastic film would add all the above described advantages of a film outer covering and metal foil could be utilized where superior heat reflection, printing and promotional characteristics were advantageous.

Figure 5:
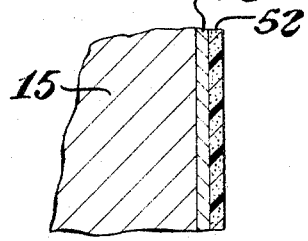
FIGURE 5 is a view like FIGURE 3 only showing yet another modified form of the invention.

Yet another advantageous embodiment of the invention is illustrated by the cross section of FIGURE 5. Here the laminated walls of the carton comprise an inner ply 50 of papersheet and an outer ply 52 of plastic foam. This laminate combination would be desirable in circumstances where the previously discussed advantages of an outer covering of plastic foam were wanted without resorting to a three ply material. Plastic film could also serve as the inner ply 50 and would be especially advantageous in situations where there would be a substantial delay between packaging and sale of the product. In these instances, the relative moisture impermeable film ply would prevent quality impairment due to ice cream moisture loss.

Figure 6:
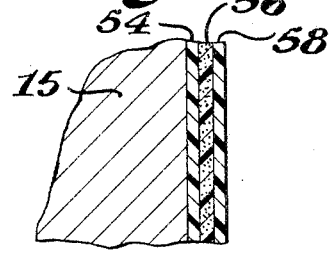
FIGURE 6 is a view like FIGURE 3 only showing still another modified form of the invention.

Still another advantageous embodiment of the invention is illustrated by the cross-section of FIGURE 6 wherein a laminate comprised of inner and outer plies of plastic film 54 and 58 encapsulate a ply of plastic foam 56. This combination was found to produce a package of high class variety combining the beneficial aspects of a plastic film outer covering with the highly impermeable advantage of a plastic film inner ply.

Embossing or corrugating may be done on either the film and/or foam components of the carton to add both greater structural properties and promotional appeal. Also, when superior stiffness or structural properties are desired, embodiments may be placed between the laminate plies to obtain these properties. For instance, a preprinted papersheet strip could be placed between the plies of a plastic film and plastic foam combination of FIGURE 3, to add both stiffness and decorative appeal.

Other foams which have insulation, impermeable, and inert properties like polystyrene foam such as polyethylene foam and latex foam slurry as described in U.S. Patent No. 3,215,647, and Belgium Patent No. 641,711 may be readily substituted for the polystyrene foam ply or plies. Also, other plastic films which exhibit hinging, fold, impermeable, and inert properties like that of polystyrene film such as polyproylene film and polyethylene film may be easily substituted for the polystyrene film ply or plies.

While certain representative embodiments and details have been shown for the purpose of illustrating the invention, it will be apparent to those skilled in the art that various changes and modifications can be made therein without departing from the spirit and scope of the invention.

I claim:
1. An insulated frozen dessert package comprising an insulated collapsible container formed from a foldable blank, said container having peripheral walls defining an enclosure, said walls comprsing laminated plies of material, said laminate including at least one ply of a thermally insulating plastic foam and at least one ply of papersheet, the plastic foam ply comprising one surface of the container and having a density in the range of about 2 to about 8 pounds per cubic foot, the thickness of said plastic foam in said laminate being between about 20 and 80 thousandths of an inch, said papersheet ply having a thickness of between about 5 and 15 thousandths of an inch, and a frozen dessert product substantially filling said container, said product having physical characteristics similar to those of ice cream, ice milk, and ice sherbet.

2. The package of claim 1 wherein the plastic foam ply has insulating and inert properties similar to those of closed cell polystrene foam, said plastic foam ply comprising the inner surface of said container, whereby the inert qualities of said plastic foam ply prevent said product from absorbing foreign taste, and whereby said container is provided with superior spooning characteristics.

3. The package of claim 1 wherein the plastic foam ply has insulating and inert properties similar to those of closed cell polystrene foam, said plastic foam ply comprising the outer surface of said container, whereby said container is endowed with superior esthetic and non-slip characteristics.

4. The package of claim 3 wherein said papersheet ply is sandwiched between plastic foam plies, said plastic foam plies having a density in the range of about 2 to about 8 pounds per cubic foot and a combined thickness of between about 20 and 80 thousandths of an inch.

5. The package of claim 1 wherein at least one of the plies is metal foil, said metal foil comprising the outer surface of said container.

6. An insulated frozen dessert package comprising an insulated collapsible container formed from a foldable blank, said container having peripheral walls defining an enclosure, said walls comprising laminated plies of material, said laminate including at least one ply of a thermally insulating plastic foam and at least one ply of plastic film, the plastic foam ply comprising one surface of the container and having a density in the range of about 2 to about 8 pounds per cubic foot, the thickness of said plastic foam in said laminate being between about 20 and 80 thousandths of an inch, and a frozen dessert product substantially filling said container, said product having physical characteristics similar to those of ice cream, ice milk, and ice sherbert.

7. The package of claim 6 wherein the plastic foam ply has insulating and inert properties similar to those of closed cell polystyrene foam and wherein the plastic film ply has hinging, inert, and impermeable properties similar to those of polystyrene film, at least two of the plies of said lamiante being secured together by a stiffness imputing adhesive.

8. The package of claim 7 wherein a substantially transparent plastic film ply comprises the outer surface of said container, said stiffness imputing adhesive layer being located adjacent said transparent plastic film ply and being pigmented to provide a background color for said package, a printed legend located on the interface side of said plastic film to positively avoid all smudging problems.

9. The package of claim 6 wherein said plastic film ply is sandwiched between plies of plastic foam, said plastic foam plies having a density in the range of about 2 to about 8 pounds per cubic foot and a combined thickness of between about 20 and 80 thousandths of an inch.

References Cited

UNITED STATES PATENTS

| | | | |
|---|---|---|---|
| 2,770,406 | 11/1956 | Lane | 229—3.5 |
| 2,917,217 | 12/1959 | Sisson | 229—3.5 X |
| 3,049,277 | 8/1962 | Shappel. | |
| 3,111,255 | 11/1963 | Skowronski. | |
| 3,189,243 | 6/1965 | Lux | 229—3.5 |

DAVID M. BOCKENEK, *Primary Examiner.*

U.S. Cl. X.R.

229—3.5, 51